April 17, 1928.
C. A. JOHNSON
1,666,386
AUTOMOBILE STEERING MASTER
Filed Dec. 1 1926
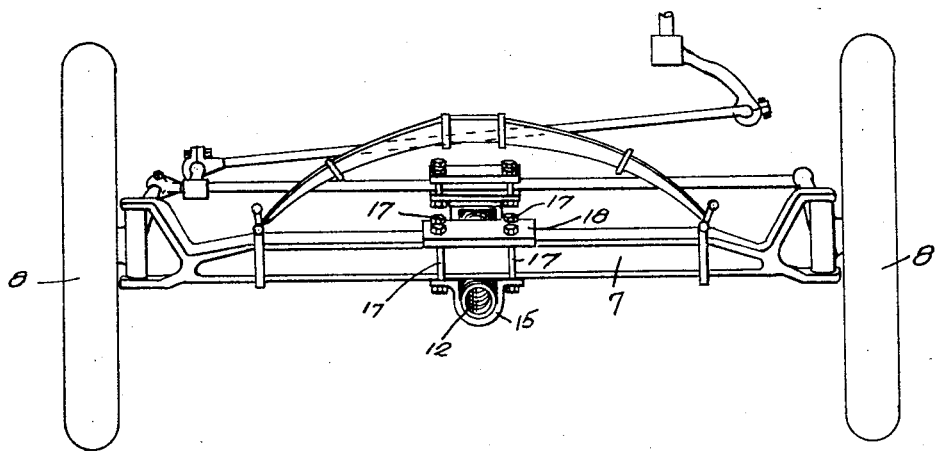
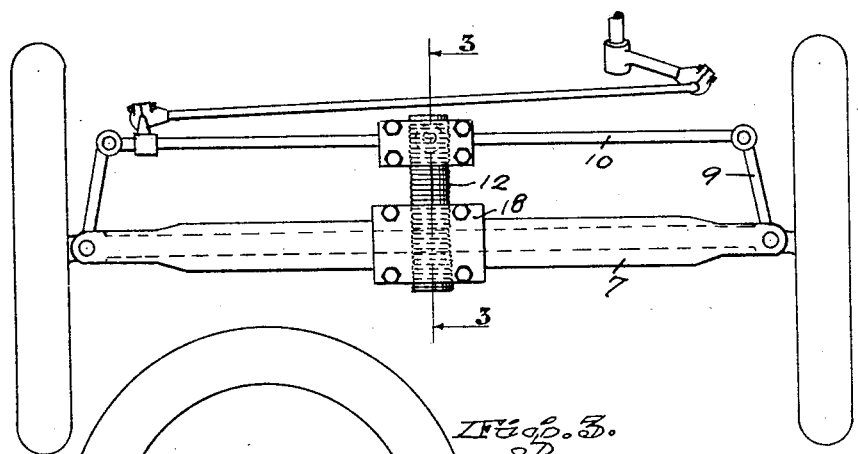
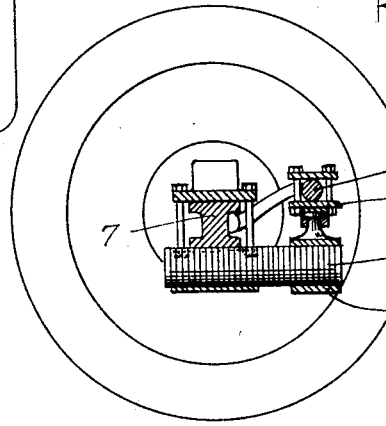
INVENTOR
CHARLES A. JOHNSON
BY
ATTORNEYS.

Patented Apr. 17, 1928.

1,666,386

UNITED STATES PATENT OFFICE.

CHARLES A. JOHNSON, OF SACRAMENTO, CALIFORNIA.

AUTOMOBILE STEERING MASTER.

Application filed December 1, 1926. Serial No. 151,987.

This invention relates to means for automatically righting an automobile when it has turned or has been turned from its straight ahead position.

An object of my invention is the provision of the simple, economical and efficient device of the character described.

With the foregoing object in view, together with such other objects and advantages as may subsequently appear, this invention resides in the construction and arrangement of parts hereinafter described and claimed, and illustrated in the accompanying drawings, in which—

Figure 1 is a front elevation of the fore part of an automobile chassis in combination with the device of my invention.

Figure 2 is a plan view of Figure 1; and

Figure 3 is a section taken on line 3—3 of Figure 2.

Referring to the drawing for a more detailed description thereof, the numeral 7 indicates the front axle of an automobile having front wheels 8. The steering mechanism comprises the usual pair of rods 9, both pivotally connected with a link 10 turning parallel to the axle 7. The helical spring 12 is rigidly secured at one end to the under side of the axle 7 by means of a clamp 15, secured to the axle by means of bolts 17, and a plate 18 resting on top of the axle. A ring 20 is swivelly connected to the plate 21, which is secured to the link 10. The interior diameter of the ring is slightly greater than the diameter of the helical coil 12, and the latter extends thru this ring and for a short distance to the rear of the ring.

The coil 12 is direct backwardly from the front axle at right angles thereto, and normally is not under tension; however, when the link 10 is moved laterally the coil also moves laterally, and is placed under a lateral tension whereby it tends to resume its normal untensioned position, and to restore the steering mechanism to the position which it normally has when the car is running at straight ahead position.

By the use of my invention a car is held steady in a straight ahead position and the front wheels are righted after the car has turned the corner.

While I have described one embodiment of my invention, modifications thereof may be readily devised without departing from the spirit of my invention, and it is to be understood that such modifications come within the scope of the appended claim.

I claim:

In combination with the axle of an automobile, a steering mechanism comprising an operating link moving parallel to the axle, a spring fixed relative to the axle and supported thereby so as to extend toward the operating link, a ring encircling said spring and a swivelled connection between the ring and the link.

CHARLES A. JOHNSON.